United States Patent [19]

Csakvary et al.

[11] 4,202,739
[45] May 13, 1980

[54] ELECTROCHEMICAL REMOVAL OF MATERIAL FROM METALLIC WORK

[75] Inventors: Tibor Csakvary; Robert E. Fromson, both of Wilkens Township, Allegheny County, Pa.

[73] Assignee: The United States of America as represented by the United Stated Department of Energy, Washington, D.C.

[21] Appl. No.: 790,226

[22] Filed: Apr. 25, 1977

[51] Int. Cl.$^2$ ............................ B23P 1/00; B23P 1/14; C25F 7/00
[52] U.S. Cl. ............................ 204/129.35; 204/129.7; 204/129.5; 204/224 M; 204/284
[58] Field of Search .......... 204/224 M, 224 R, 129.7, 204/129.6, 129.5, 129.35, DIG. 10, 271, 284, 297 R

[56] References Cited

U.S. PATENT DOCUMENTS

| | | | |
|---|---|---|---|
| 2,540,602 | 2/1951 | Thomas et al. | 204/224 R X |
| 2,590,927 | 4/1952 | Brandt et al. | 204/224 R X |
| 3,183,176 | 5/1965 | Schwartz, Jr. | 204/DIG. 10 |
| 3,433,727 | 3/1969 | Keeleric | 204/284 X |
| 3,458,424 | 7/1969 | Bender | 204/224 M |
| 3,536,603 | 10/1970 | Bonga | 204/297 R X |
| 3,637,468 | 1/1972 | Iexi et al. | 204/271 X |
| 3,751,343 | 8/1973 | Macula et al. | 204/224 R X |
| 4,045,312 | 8/1977 | Satoshi | 204/129.6 X |

*Primary Examiner*—John H. Mack
*Assistant Examiner*—D. R. Valentine
*Attorney, Agent, or Firm*—R. T. Randig

[57] ABSTRACT

Deburring, polishing, surface forming and the like are carried out by electrochemical machining with conformable electrode means including an electrically conducting and an insulating web. The surface of the work to be processed is covered by a deformable electrically insulating web or cloth which is perforated and conforms with the work. The web is covered by a deformable perforated electrically conducting screen electrode which also conforms with, and is insulated from, the work by the insulating web. An electrolyte is conducted through the electrode and insulating web and along the work through a perforated elastic member which engages the electrode under pressure pressing the electrode and web against the work. High current under low voltage is conducted betwen the electrode and work through the insulator, removing material from the work. Under the pressure of the elastic member, the electrode and insulator continue to conform with the work and the spacing between the electrode and work is maintained constant.

2 Claims, 17 Drawing Figures

ELECTROCHEMICAL REMOVAL OF MATERIAL FROM METALLIC WORK

BACKGROUND OF THE INVENTION

This invention relates to the art of removing material from metallic objects, such as in cavity sinking, boring, planing, deburring, polishing, and the like, and has particular relationship to such material removal by electrochemical machining. It is an object of the invention to provide a facility for removing material from complex metal structures at a relatively low cost.

A typical situation to which the invention is applicable is in the fabrication of cast large pump rotors with multiple helically-shaped passages. Such rotors are used to circulate liquid sodium. It was necessary to release trapped sand particles and to eliminate sharp edges associated with small cavities. Manual surface processing is costly and, in any event, only reaches over about one-half the surface which requires processing.

Typical of another structure to which this invention is applicable is the tube-support plate of the steam generator of a nuclear-reactor power supply. Typically, such a plate is composed of carbon steel, is about 11 feet in diameter and has 9300, three-quarter-inch holes and 9300, one-half-inch holes, 18,600 holes in all. These holes are drilled through the plate. The purpose of these holes is to support the hairpin heat-exchanger tubes composed of INCONEL alloy. It is necessary that the burrs on the edges of these holes be removed to preclude scratching the tubes and reducing their lives. To preclude damage to the tubes, it is also desirable that the edges of the holes be rounded off.

The prior art practice is to deburr the 18,600 holes manually with power tools. This operation consumes about forty-eight man hours of labor. Shot-blasting machines have proven unsatisfactory.

It has been proposed that electrochemical machining be applied for the deburring operation to remove unwanted material as in reverse plating. In accordance with the teachings of the prior art, electrochemical machining is carried out by a fixed electrode. This requires precision electrodes which must be maintained precisely spaced from the work as the machining progresses. Typically, in fixed-electrode deburring the fixed electrode is positioned about 0.020 inches from the burr, an electrolyte is conducted at a high velocity between the burr and the electrode, and a high-current-density, low voltage, direct current is conducted between the electrode and the work. The burr material is deplated and carried away in the electrolyte, typically as a hydroxide. A difficulty with fixed-electrode deburring is that as the burr material is removed, the width of the gap between the electrode and the work increases, increasing the gap resistance and decreasing the current density and the rate of removal of material. Experience with electrochemical fixed-electrode deburring has led to the conclusion that the following parameters must be controlled.

1. Position and proximity of the electrode to the burr.
2. Velocity, pressure and direction of the electrolyte.
3. Applied direct current voltage.
4. Cycle time.

Parameters 2, 3, and 4 can readily be controlled, but parameter 1 presents serious difficulties and costs. Indeed, it has been found that in many cases the cost of the precision electrodes required and their position control is prohibitive. Particularly high is this cost where large and complex geometry parts, such as the pump rotor and the tube support plate, are to be processed or where the exact position of the unwanted material cannot be readily predicted.

It is an object of this invention to overcome the above-described difficulties and disadvantages of the prior art and to provide relatively low-cost electrochemical machining apparatus for removing material from work.

It is also an object of this invention to provide such apparatus which shall not require precision electrodes. It is a further object of this invention to provide such apparatus in whose use the position of the electrode with respect to, and the spacing of the electrode from, the work shall be automatically maintained. An additional object of this invention is to provide a method of electrochemical machining in whose practice the above difficulties and disadvantages of the prior art shall be overcome. It is an object of the invention to provide electrochemical machining apparatus and a method for deburring a plate having holes therein in the use of which the edges of the holes shall not only be effectively deburred, but shall also be rounded.

SUMMARY OF THE INVENTION

In accordance with this invention an electrochemical machining apparatus is provided which includes work-conforming electrode means whose spacing and positioning with respect to the work is automatically maintained by the pressure of the electrolyte. The electrode means includes a fine-mesh metal screen, typically of stainless steel, and a layer of fine woven insulating cloth. The screen and cloth cover the entire area of the work being compressed against the work by a porous elastic member which is pressurized by the electrolyte that flows through it to the electrode and work. As material is removed from the work, the gap between the electrode and the work remains constant because the elastic member continuously presses the screen electrode against the insulator and work.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
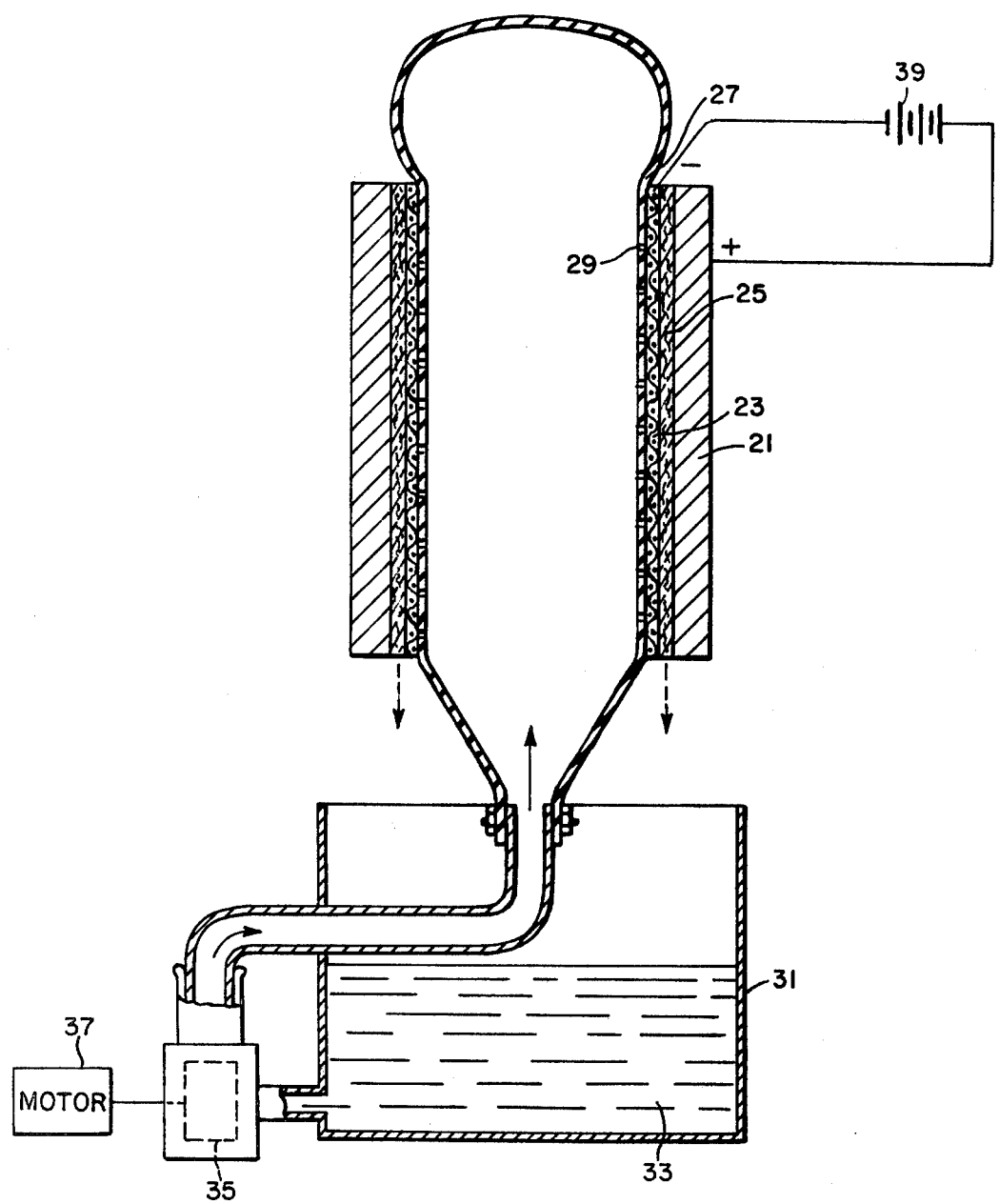
FIG. 1 is a view, generally diagrammatic, and partly in longitudinal section, showing an embodiment of this invention used in the processing of the internal surface of cylindrical work.

The apparatus shown in FIG. 1 is used to deburr and remove undesirable material from the inner surface of a cylinder 21, typically of stainless steel. This cylinder typifies the above-mentioned pump rotors. The electrochemical machining apparatus includes a metallic wire screen electrode 23 typically composed of stainless steel of 120 mesh. The screen typically is formed of wires of 0.0041 inches diameter and has openings whose maximum dimension is 0.0043 inches. The apparatus also includes a cloth insulator 25 typically of glass cloth of double thickness adding up to 0.020 inches. The insulator 25 extends over the inner surface of cylinder 21 and the screen electrode 23 extends over the insulator 25. The apparatus also includes an elastic member 27 in the form of a bladder, typically of rubber. The member 27, over a portion of its area, extends over the screen electrode 23 and has perforations 29 over this portion. There is also a tank 31 containing electrolyte 33. Typically, this electrolyte 33 is a solution of sodium chloride in water; one pound of the NaCl per one gallon of water. The electrolyte is pumped into the member 27 by a pump 35 driven by a motor 37. The holes 29 in the member 27 are relatively small. The feed of the electrolyte is so regulated that it exerts considerable pressure on the member 27, causing this member to balloon out and apply pressure at the interfaces between the electrode 23 and insulator 25 and the cylinder 21. This pressure causes the electrode 23 and insulator 25 to conform to the inner surface of cylinder 21. The electrolyte flows through the perforations 29 in the member 27, the holes in the screen electrode 23 and the insulator 25 to the inner surface of the cylinder 21 and then down along this surface to return to the tank 31. The apparatus also includes a regulatable direct-current power supply 39. This supply 39 is shown synbolically as a battery but is typically derived from a commercial supply through a rectifier. Typically, this supply delivers about 15 amperes at 12 volts. The supply 39 is connected with its negative terminal to screen electrode 23 and its positive terminal to cylinder 21. A deplating potential is thus impressed between the electrode 23 and cylinder 21, causing the electrolyte to remove material from the inner surface of cylinder 21. The voltage of the supply 39 is such that, for the spacing between the electrode 23 and the inner surface of the cylinder 21, there is no arcing between the electrode and the surface.

In the practice of this invention, the cylinder 21, electrode 23 and insulator 25 are mounted as described above. The supply voltage is then raised to 8, 10 and 12 volts with the electrolyte 33 circulating through the elastic member 27, electrode means 23-25 and cylinder 21. It was found that effective deplating is accomplished.

Figure 2:
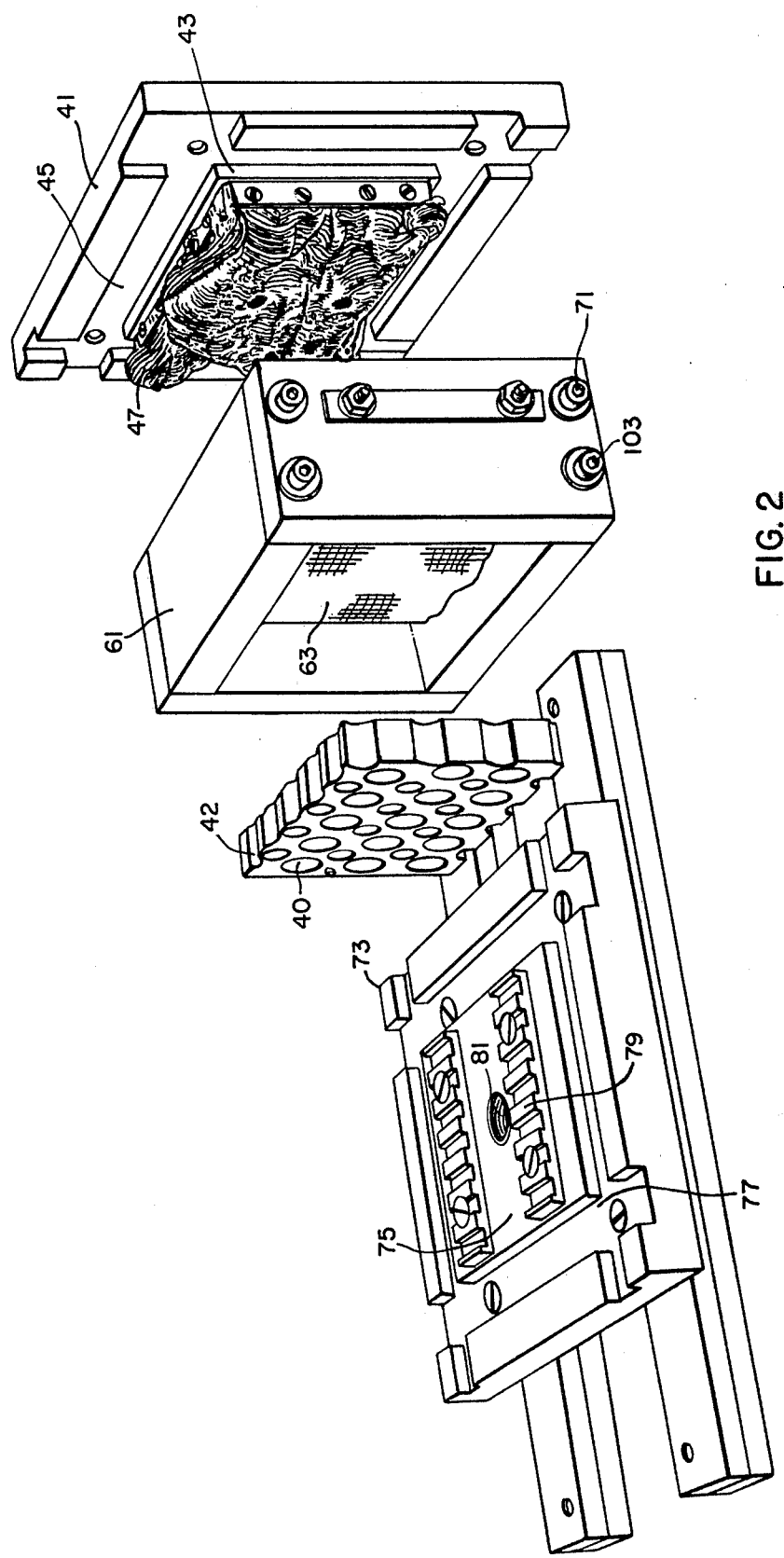
FIG. 2 is an exploded view showing another embodiment of this invention used in the deburring of a plate having holes and to rounding off of the edges of the hole.
Figure 3:
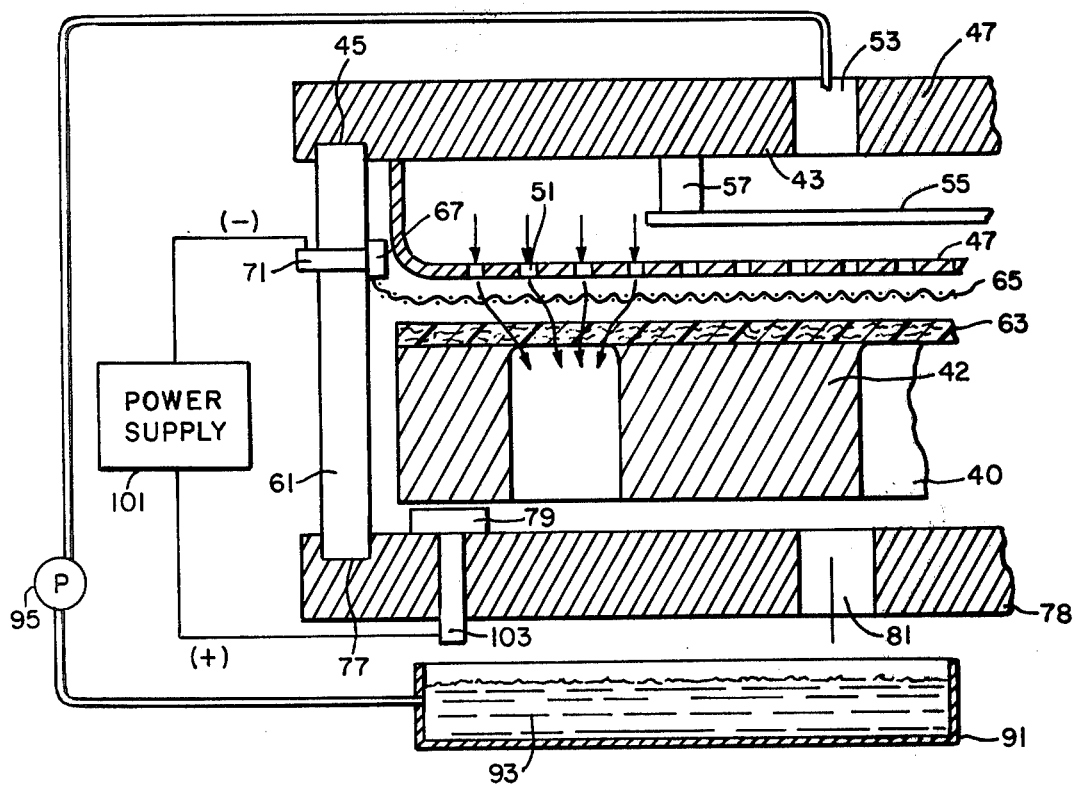
FIG. 3 is a fragmental view generally diagrammatic and in longitudinal section of the apparatus shown in FIG. 2.
Figure 5:
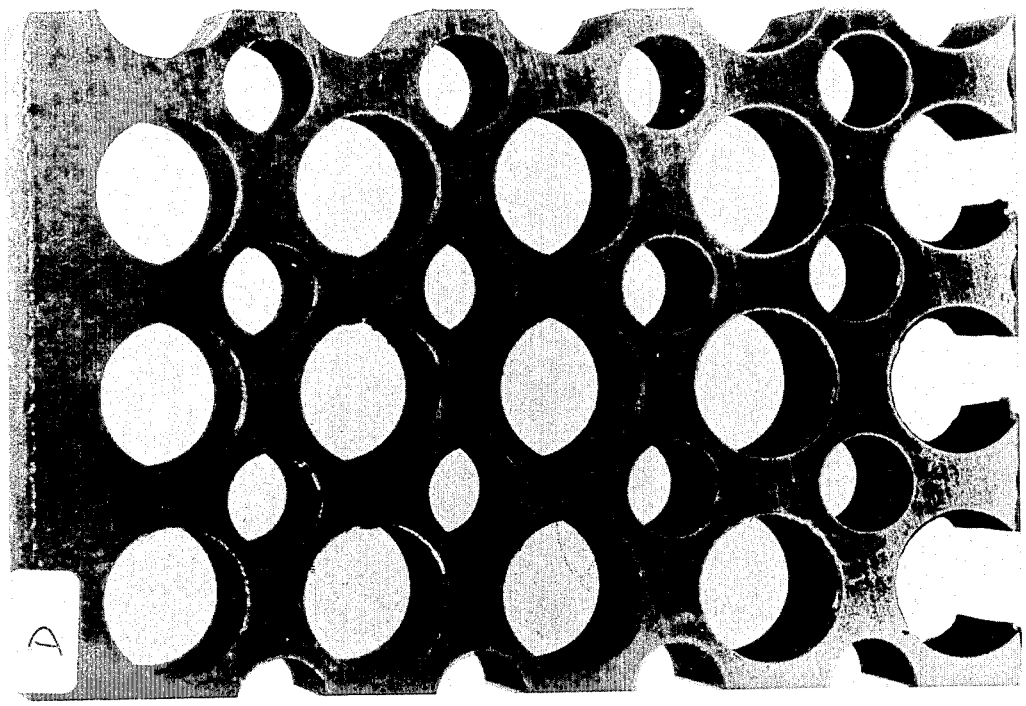
FIG. 5 is a photograph of the drill exit side of this plate after sanding or sand blasting to preclude damage to the cloth insulator.
Figure 4:
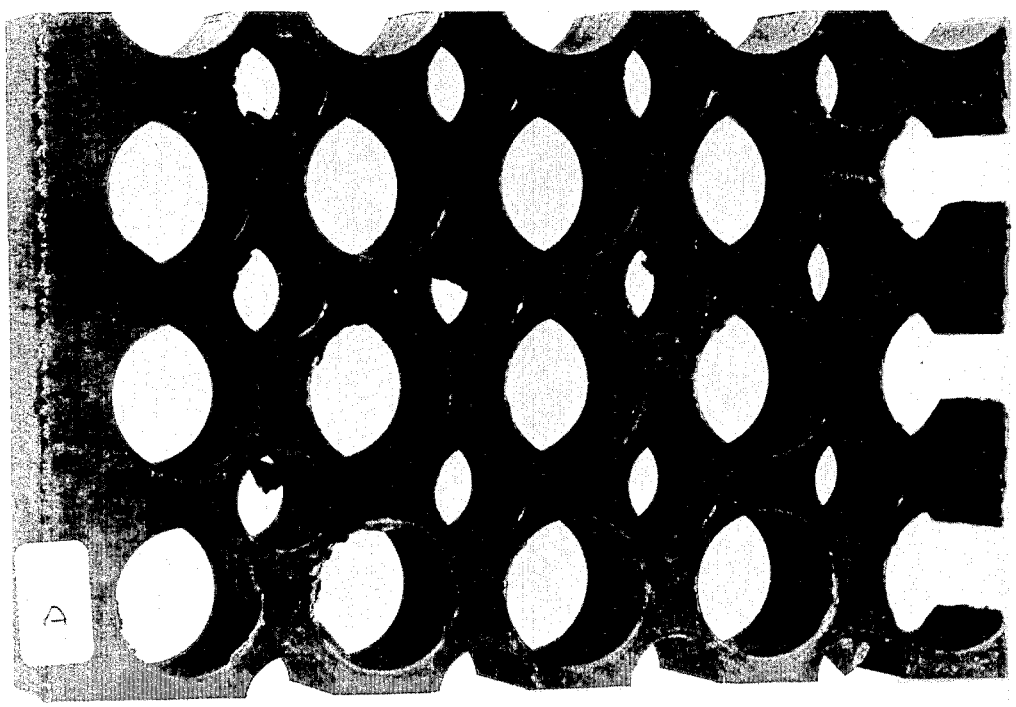
FIG. 4 is a photograph showing the drill exit side of a section of a tube-support plate as received for processing with the apparatus shown in FIGS. 2 and 3.
Figure 7:
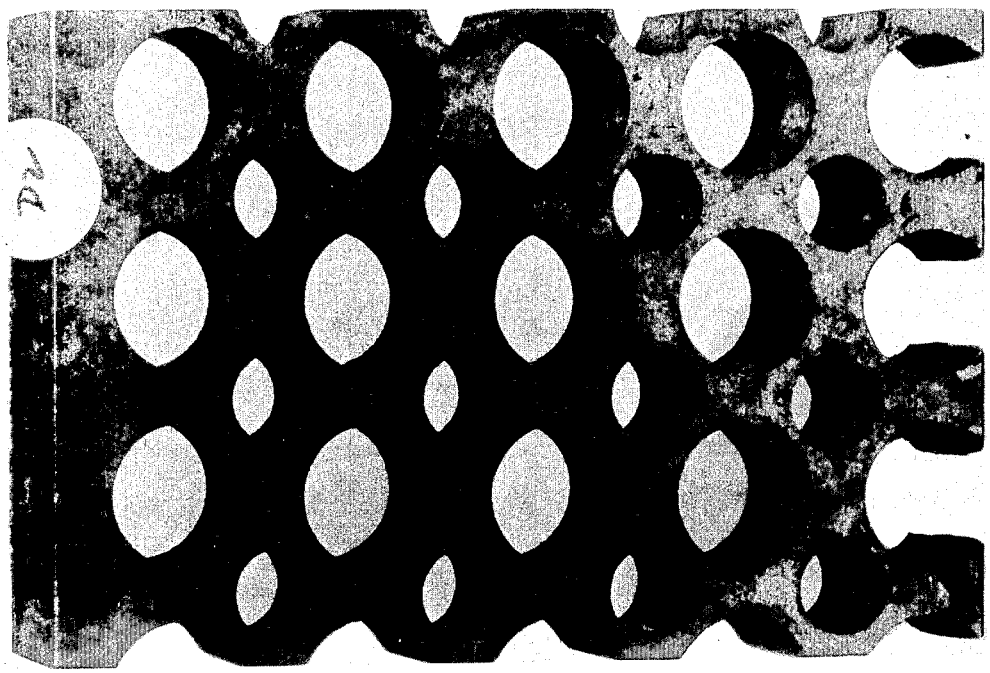
FIG. 7 is a photograph of the drill entrance side of the plate after processing.
Figure 6:
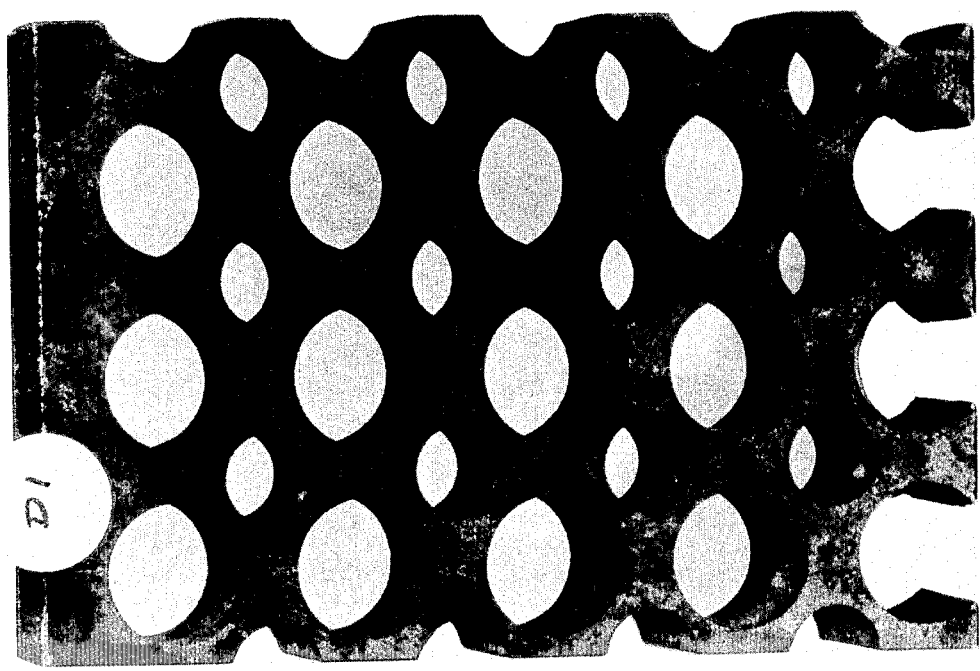
FIG. 6 is a photograph of the drill exit side after processing with the apparatus shown in FIGS. 2 and 3.
Figure 9:
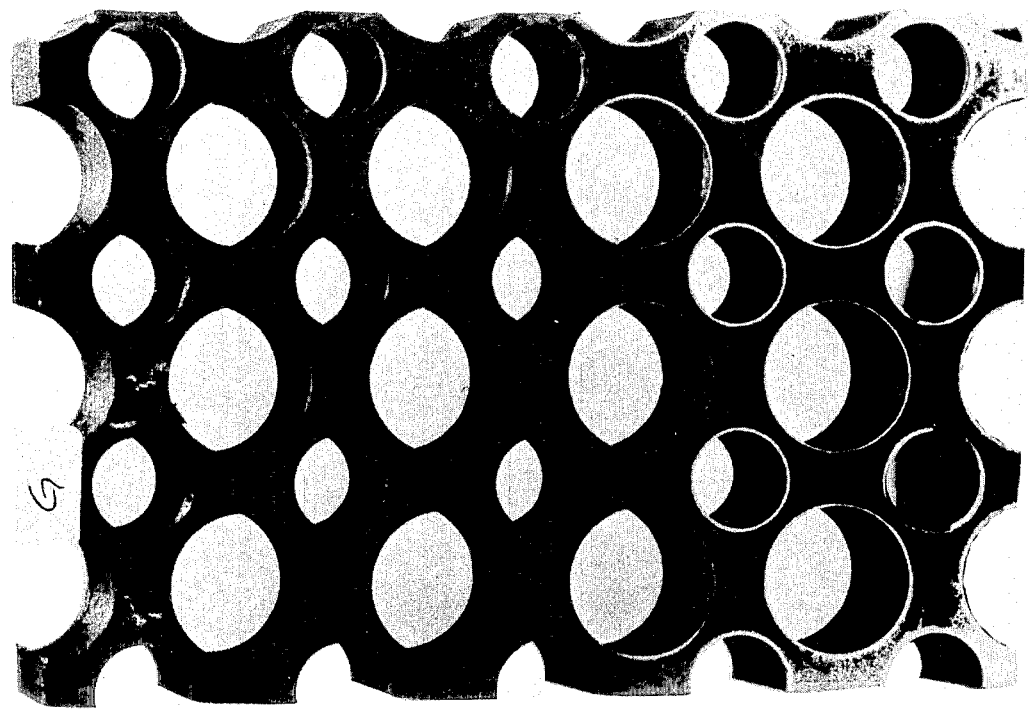
FIG. 9 is a photograph showing the drill exit side of this plate after sanding.
Figure 8:
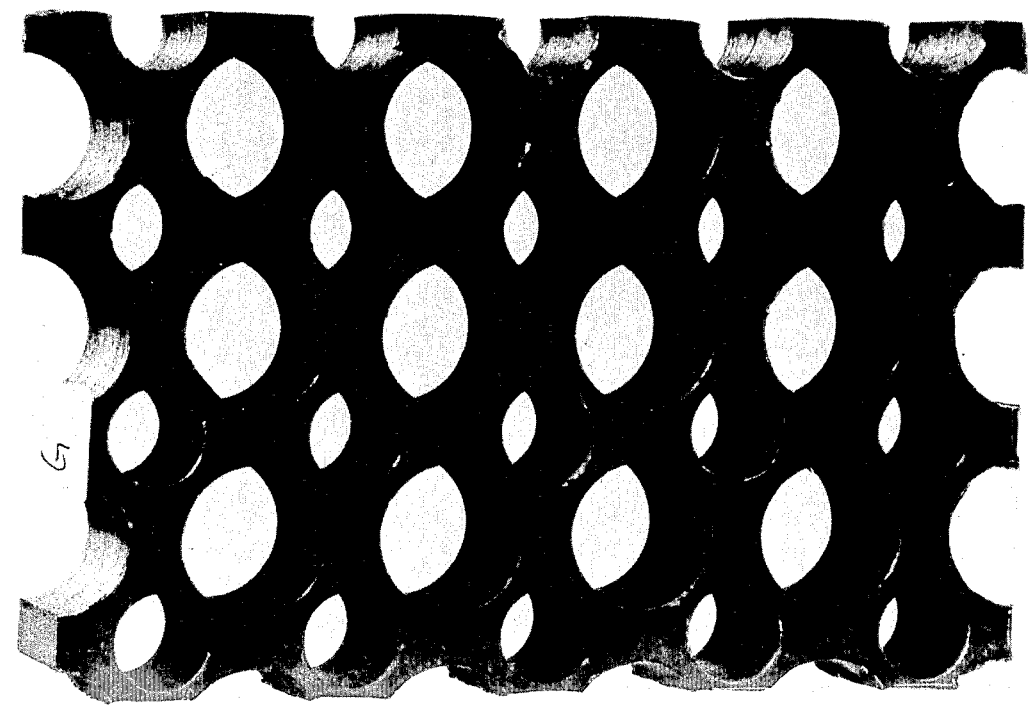
FIG. 8 is a photograph showing the drill entrance side of a section of a tube plate as received for processing.
Figure 11:
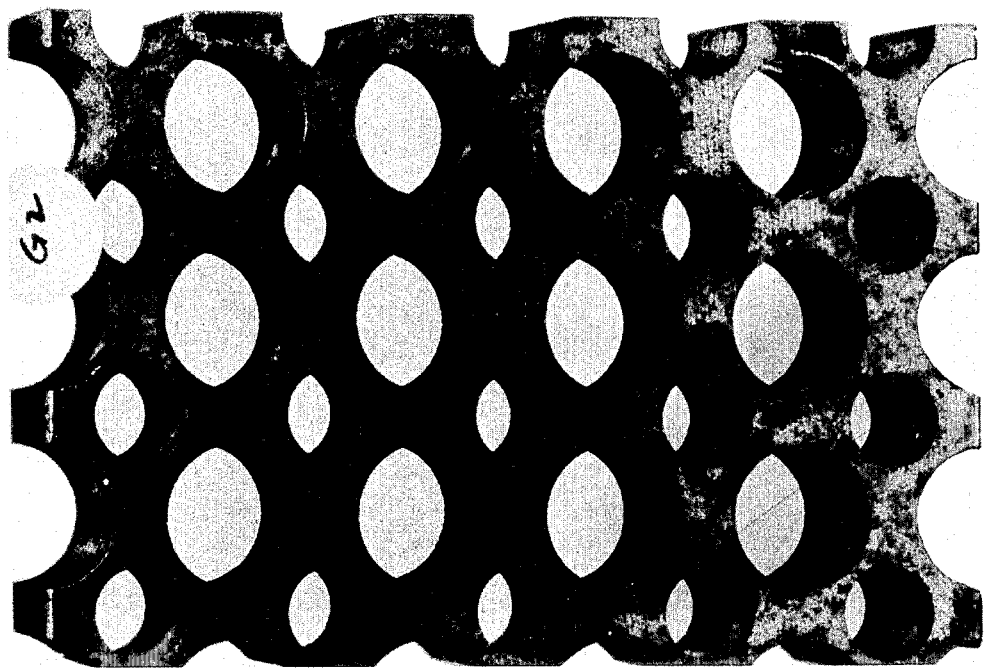
FIG. 11 is a photograph showing the drill entrance side of this plate after processing.
Figure 10:
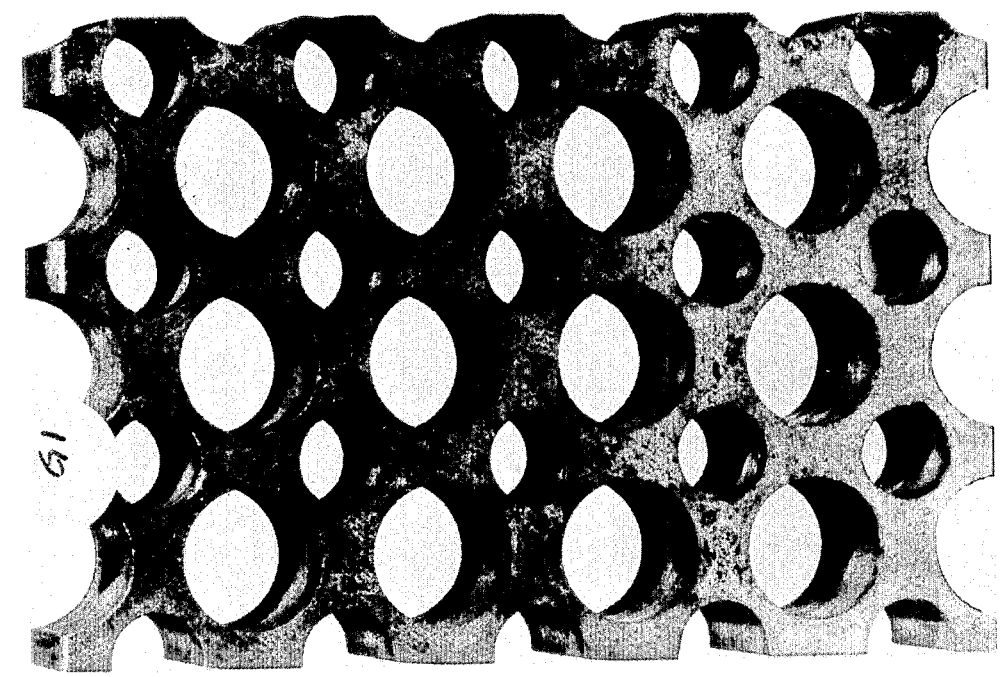
FIG. 10 is a photograph showing the drill exit side of this plate after processing.
Figure 13B:
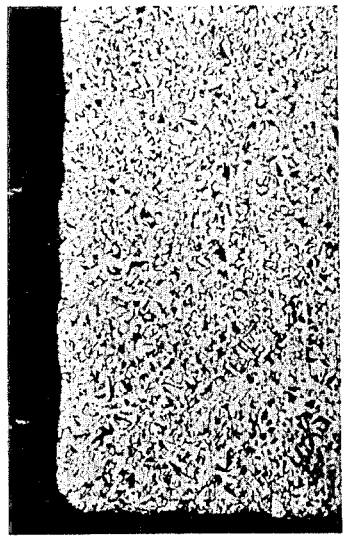
FIGS. 13A and 13B are photomicrographs, at fifty times magnification, showing the boundaries of a hole in a section of a plate after processing.

The apparatus shown in FIGS. 2 and 3 is used to remove the burrs from the edges of the holes 40 of a section 42 of a tube plate and to round off these edges. This apparatus includes a plate 41 of insulating material such as phenolic condensation product. A rectangular projection 43, defined by grooves 45, extends from one face of the plate 41. An elastic member 47 having small perforations 51 (FIG. 3) is sealed to the boundaries of the projection 43. The plate 41 has an opening 53 (FIG. 3) in the opposite face, to which a nipple (not shown) for receiving electrolyte, is connected. A baffle 55 (FIG. 3) is secured by studs 57 to the face of the plate 41 within the elastic member 47.

The elastic member 47 is typically composed of natural sheet rubber about 0.030 inches thick. Such a member 47 has been found to operate highly satisfactorily. Typically, the member 47 is perforated by perforations 51 of 1/16 inch diameter on 3/16 inch centers. The baffle 55 minimizes the impact of the electrolyte on the member 47 and on the other parts on which it exerts pressure.

The apparatus shown in FIGS. 2 and 3 also includes a frame 61 of insulating material. A deformable insulating web 63 and a deformable screen electrode 65 (FIG. 3) are secured within this frame 61. The electrode 65 is typically composed of 120 mesh stainless-steel screen of 0.0041 inch diameter wire and with openings whose largest dimension is 0.0043 inches. Copper shunts 67 (FIG. 3) are brazed to the screen on two opposite sides. The insulating web 63 is typically composed of 100% polyester double-knit cloth which has been found to operate highly satisfactorily. The web 63 has a thickness of 0.030 inch when dry, 0.024 inch when wet. Glass cloth, natural cotton and combinations of polyester and cotton (e.g., 50% polyester, 50% natural cotton) may also be used. One of the shunts 67 is connected to a terminal 71 extending from the frame 61.

The apparatus also includes a second plate 73 of insulating material having a central rectangular projection 75 defined by grooves 77. Spaced metallic bars 79 extend from the projection 75. The plate 73 has a central opening 81.

When the apparatus shown in FIG. 2 is assembled, the opposite ends of the frame 61 engage the grooves 45 in the plate 41 on the side of the elastic member 47 and the grooves 77 in plate 73 and are sealed in these grooves sufficiently to suppress leakage of electrolyte. The section 42 of the tube plate is disposed on the bars 79 of plate 73 and is abutted on the opposite side by the insulating cloth 63; the screen electrode 65 is abutted by the elastic member 47.

The apparatus shown in FIGS. 2 and 3 also includes a reservoir 91 containing an electrolyte 93. Typically, the electrolyte 93 is sodium nitrate-water solution, 1.67 pounds of $NaNO_3$ per gallon of water. This solution has a specific gravity of 1.126 and has been found to perform highly satisfactorily in use. The electrolyte is fed by pump 95 to the enclosure defined by the elastic member 47 through opening 53, passes through the openings 51 in the member 47, through the screen electrode 65, the insulator 63 and the holes 40 and returns to the reservoir 91 through the hole 81.

The apparatus shown in FIGS. 2 and 3 also includes a direct current power supply 101. The positive pole of this supply 101 is connected to terminal 103 which is in turn connected through a bar 79 to the plate 42; the negative pole is connected to terminal 71 and thence to the screen electrode 65.

Typically, the work is processed with an Anocut Model VCS 60 Electrochemical Machine. Such a machine includes a 30,000 power supply 101 capable of delivering 0 to 3000 amperes at 6 to 16 volts D.C. This voltage does not produce arcing for the spacing between the electrode 65 and the plate 42. This machine also includes a pump 95 capable of delivering 20 gallons per minute of the electrolyte. The rate of delivery of electrolyte is set so that the elastic member 47 exerts sufficient pressure to cause the screen electrode 65 and the insulator 63 to conform with the plate on work 42.

Figure 14B:
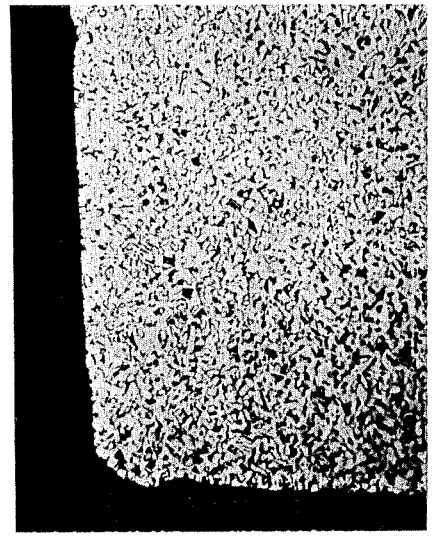
FIGS. 14A and 14B are similar photomicrographs of the boundaries of a hole in another section of a plate after processing.
Figure 13A:
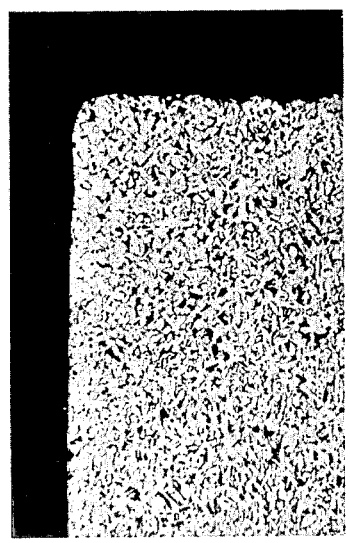
Figure 14A:
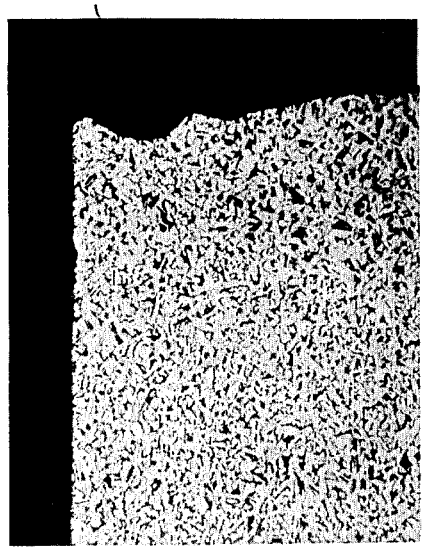

A number of sections 42 of the tube plate were processed with the apparatus shown in FIGS. 2 and 3. Typically, the dimension of each section was 3⅜ inches wide by 5⅜ inches long by ¾ inch thick. FIGS. 4 through 7 and 8 through 11 show the positive results obtained with two of the sections. The following Table I shows the data covering the processing of and results obtained with a number of sections identified in the left hand column as A through H.

the sections are smoothed, further reducing the probability of damage to the tubes. FIGS. 14A and 14B show an undercut 111 for section H. This undercut 111 is what remains of a drill mark superficially smoothed by the processing.

Figure 15:
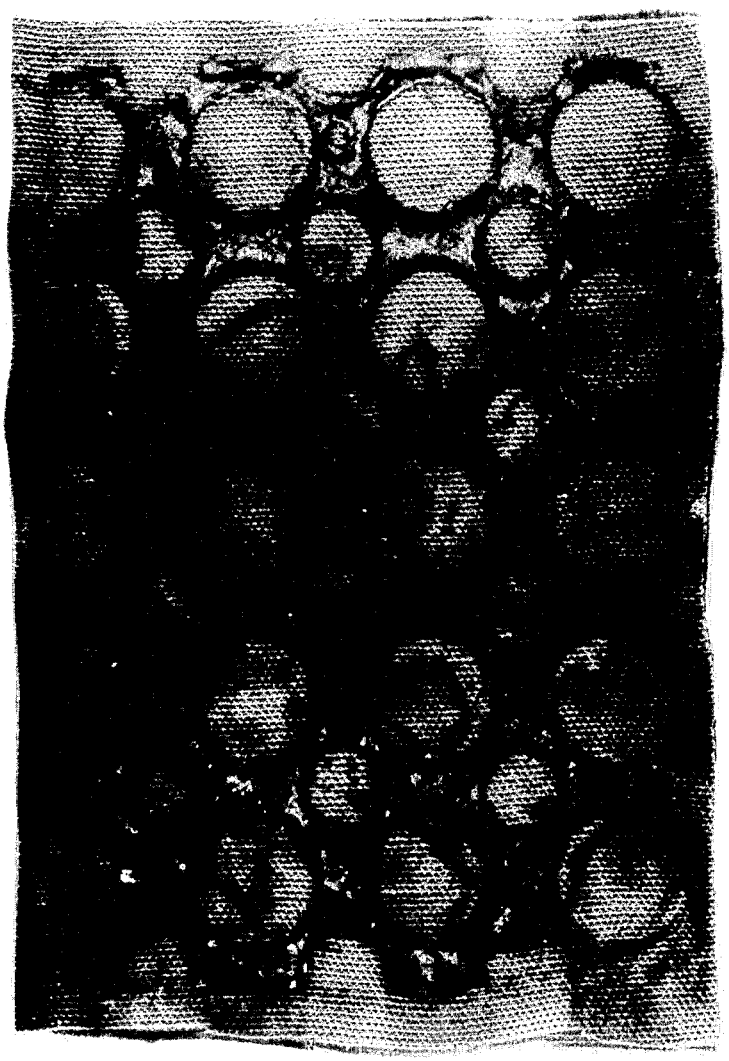
FIG. 15 is a photograph showing the insulator of the electrode means used in the practice of this invention to process a section of a plate with holes drilled therein.

During the processing with 100% polyester double-knit cloth insulator 63, the layers of the cloth fused together as shown in FIG. 15. This fusing resulted in a flat, dense insulator in contact with the solid surface of the plate 42. In effect, the insulator 42 becomes a self-conforming mask during processing.

The sodium nitrate electrolyte requires a longer processing time than sodium chloride. However, the $NaNO_3$ provides a superior surface finish with less pronounced sharp points on the edges of the holes 40.

The practice of this invention affords opportunity for substantial cost saving. Superior deburring can be obtained in 3–6 hours compared to manual methods which require 48 hours. The following Table II shows the cost analysis for various alternatives for the practice of this invention to deburr a tube support plate.

TABLE II

| ALTERNATIVES WITH VARIOUS POWER SUPPLIES | | | |
|---|---|---|---|
| Average Current Density | 27.7 Amp/Inch$^2$ | | |
| Tube Support Area | 7692 Inch$^2$ | | |
| 30,000 Amp Power Supply Process ⅛ sector per index | | | |
| | Operational Hours | Man Hours | % Saving |
| Deburr | 1.60 | | |

TABLE I

| Sample* | Area Square Inch | Volts | Amps | Flow GPM** | Amp 2 Inch | Hole Diameter Body | Hole Diameter Edge | Δ*** Diameter Inch | Remarks |
|---|---|---|---|---|---|---|---|---|---|
| A1 | 8.632 | 10 | 296 | 14.0 | 34.29 | .774 | .784 | .010 | Deburring complete except drill flutes |
| A2 | | 10 | 260 | 14.5 | 30.12 | | .784 | .010 | |
| B1 | 8.666 | 10 | 258 | 13.5 | 29.77 | .772 | .783 | .011 | Deburring complete except drill flutes |
| B2 | | 10 | 262 | 13.0 | 30.23 | | .786 | .014 | |
| C1 | 8.018 | 11 | 345 | 14.5 | 43.03 | .771 | .778 | .007 | Deburring complete except drill flutes |
| C2 | | 11 | 343 | 14.3 | 42.78 | | .783 | .012 | |
| D1 | 7.747 | 10 | 233 | 13.0 | 30.08 | .771 | .782 | .011 | Deburring complete |
| D2 | | 10 | 217 | 13.3 | 28.01 | | .782 | .011 | |
| E1 | 8.355 | 10 | 188 | 14.0 | 22.50 | .775 | .788 | .013 | Deburring complete |
| E2 | | 10 | 210 | 14.0 | 25.13 | | .789 | .014 | |
| F1 | 8.236 | 10 | 225 | 14.0 | 27.32 | .773 | .784 | .011 | Deburring complete |
| F2 | | 10 | 222 | 13.3 | 26.95 | | .787 | .014 | |
| G1 | 8.870 | 10 | 207 | 13.0 | 26.30 | .773 | .784 | .011 | Deburring complete |
| G2 | | 10 | 210 | 13.5 | 26.68 | | .787 | .014 | |
| H1 | 8.139 | 10 | 203 | 15.0 | 24.94 | .773 | .786 | .013 | Deburring complete |
| H2 | | 10 | 212 | 15.0 | 26.05 | | .784 | .011 | |

*X1 Drill exit side
X2 Drill entry side
** - gallons per minute
*** - change in diameters in processing
All tests conducted at 20 psig inside fixture D1 and D2 and G1 and G2 correspond to the drill-exit side and the drill-entrance side, respectively, of the sections 42 shown in FIGS. 4 through 7 and 8 through 11.

Figure 12:
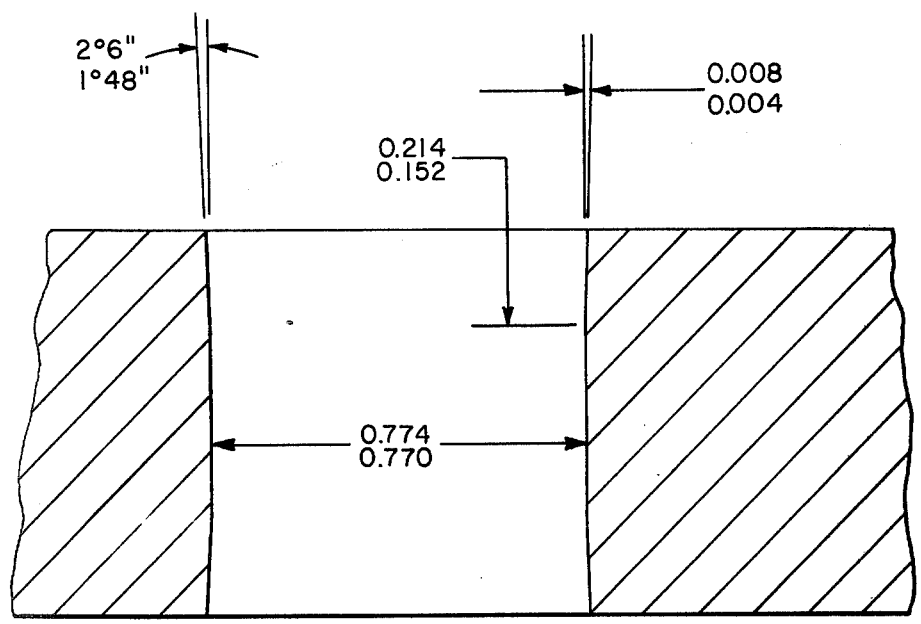
FIG. 12 is a view in section showing the tolerances of the holes in the plates shown in FIGS. 4 through 11 after processing.

FIG. 12 shows the tolerances for the hole dimensions derived from sections A through H.

FIGS. 13A and 13B and FIGS. 14A and 14B each show a photomicrograph of a hole 40 of sections A and H of Table I. These photomicrographs show that the deburring is complete and that the hole edges are clearly deburred and have a small radius (rounding) at the intersection with the surface of the plate. The hole edge is recessed about 0.006 inch from the basic hole boundary. This combination of edge radius and recess minimizes the possibility of damage to the tubes which are inserted in the holes. Drill marks near the surfaces of

| | | | | |
|---|---|---|---|---|
| Index | | 0.40 | | |
| Handle | | 0.17 | | |
| | Total | 2.17 | 4.30 | 91.0 |
| 20,000 Amp Power Supply Process 1/11 sector per index | | | | |
| Deburr | | 2.20 | | |
| Index | | 0.55 | | |
| Handle | | 0.17 | | |
| | Total | 2.92 | 5.84 | 87.8 |
| 10,000 Amp Power Supply Process 1/22 sector per index | | | | |
| Deburr | | 4.40 | | |
| Index | | 1.10 | | |
| Handle | | 0.17 | | |
| | Total | 5.67 | 11.34 | 76.4 |

We claim:

1. The electrochemical machining method of removing material from metallic work with an electrolyte with apparatus including a deformable perforated electrically insulating web, a deformable perforated electrically conducting web, and a low voltage power supply, the said method comprising, placing said insulating web on said work so that it conforms with said work, placing said conducting web on said insulating web so that it is separated from, insulated with respect to, and conforms with said work, conducting said electrolyte through said webs to said work, responsive to the pressure exerted by said electrolyte applying pressure to said electrode to maintain the spacing between said electrode and work, and supplying a high current from said supply between said conducting web and work to remove said material from said work, the voltage of said supply being so low that no arcing occurs between said conducting web and said work.

2. The method of claim 1 wherein the work is sanded prior to the placing of the insulating web on the work to avoid damaging the web.

* * * * *